United States Patent [19]
Panzica

[11] Patent Number: 5,437,185
[45] Date of Patent: * Aug. 1, 1995

[54] MOTORCYCLE SPEEDOMETER-TACHOMETER

[75] Inventor: Ignatius J. Panzica, Morgan Hill, Calif.

[73] Assignee: Custom Chrome, Inc., Morgan Hill, Calif.

[ * ] Notice: The portion of the term of this patent subsequent to Jul. 18, 2006 has been disclaimed.

[21] Appl. No.: 967,619

[22] Filed: Oct. 28, 1992

Related U.S. Application Data

[63] Continuation of Ser. No. 838,918, Feb. 21, 1992, abandoned, which is a continuation of Ser. No. 727,352, Jul. 8, 1991, abandoned, which is a continuation of Ser. No. 471,484, Jan. 29, 1990, abandoned, which is a continuation of Ser. No. 371,196, Jun. 26, 1989, abandoned, which is a continuation of Ser. No. 215,252, Jul. 5, 1988, Pat. No. 4,848,154.

[51] Int. Cl.$^6$ .............................. G01P 1/08
[52] U.S. Cl. ........................ 73/493; 73/489; 73/866.3; 116/62.4
[58] Field of Search .............. 73/493, 489, 495, 866.3; 116/62.1, 62.4, 280, 300; 324/166; 362/29; D10/98, 124

[56] References Cited

U.S. PATENT DOCUMENTS

| 840,569 | 1/1907 | Lea ......................... 116/300 |
| 1,717,653 | 6/1929 | Berge ....................... 116/300 |
| 1,878,035 | 9/1932 | Vickery .................... 116/300 |
| 2,518,068 | 8/1950 | Rodanet ................... 116/300 |
| 3,205,707 | 9/1965 | Richter .................... 116/300 |
| 4,848,154 | 7/1989 | Panzica ..................... 73/493 |

OTHER PUBLICATIONS

Harley–Davidson PN 67066–76 (Jun. 1976) Speedometer Isolation Kit IFL, FLH.
Operation Maint, Parts Listing and Specs for 1950–1957 Harley Davidson PN 67031–68 (Dec. 1981).
Custom Chrome Inc. Catalogue (Feb. 1987) pp. 354, 350 and 356.

*Primary Examiner*—John E. Chapman
*Attorney, Agent, or Firm*—William W. Haefliger

[57] ABSTRACT

A motorcycle speedometer assembly includes a casing, and a display face on the casing; a first rotary indicator at the display face and rotatable about a first axis, there being first speed indicating indicia on the display first face with which the indicator registers as it rotates about the axis; a first drive responsive to motorcycle forward speed and connected with the first indicator for rotating the indicator in proportion to motorcycle speed to register with corresponding first indicia; and a second indicator at the display face and rotatable about a second axis to indicate motorcycle engine RPM, the second axis offset from the first axis, there being second indicia on the display face with which the second indicator registers as it rotates about the second axis, the second indicia indicating tachometer increasing values of RPM; and a second drive responsive to motorcycle engine RPM and connected with the second indicator for rotating the second indicator in proportion to engine speed to register with corresponding second indicia; also, a rearwardly elongated, upwardly bulged, wedge shaped carrier supports the casing, the carrier having an upper surface substantially flush with said face, the carrier tapering rearwardly from said casing to incline the display face toward the motorcycle rider.

8 Claims, 2 Drawing Sheets

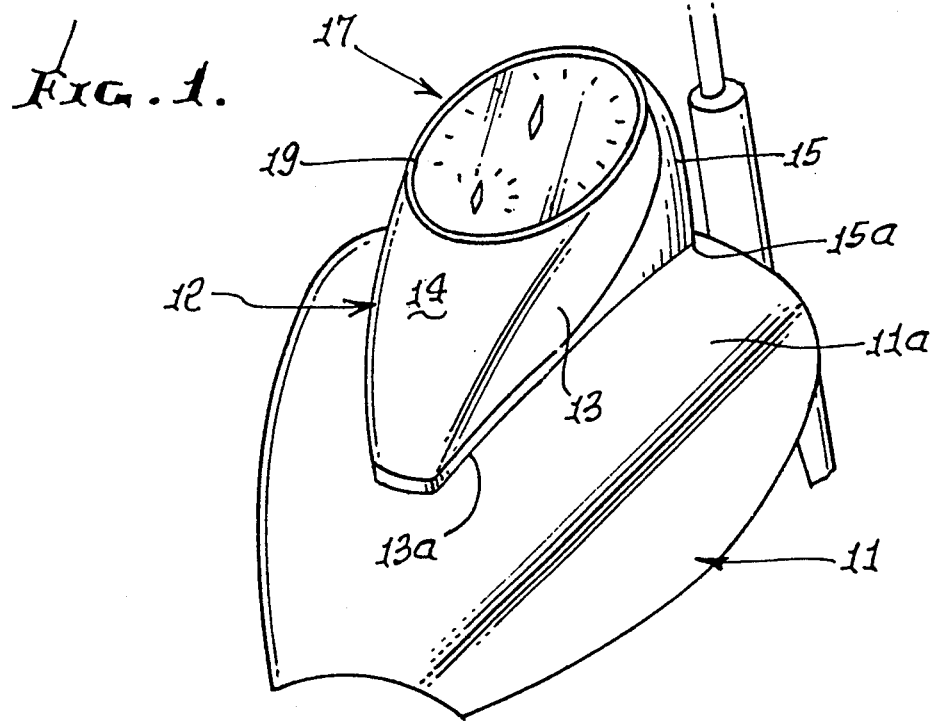
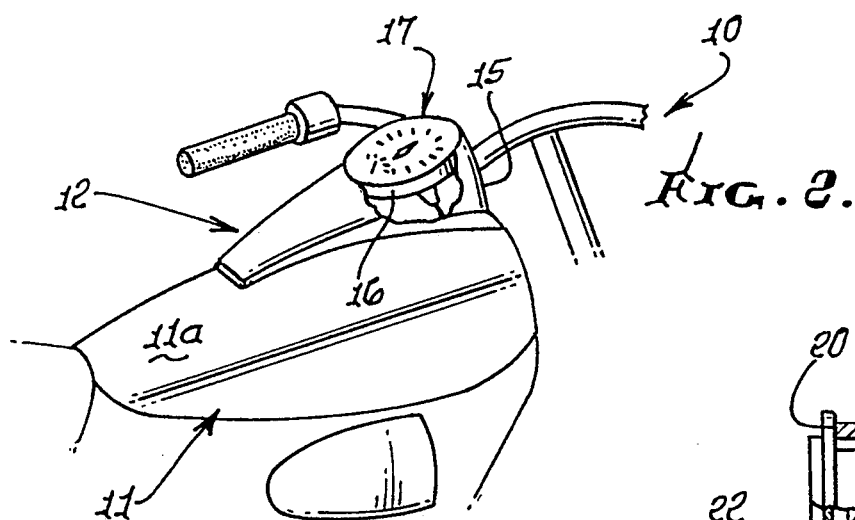
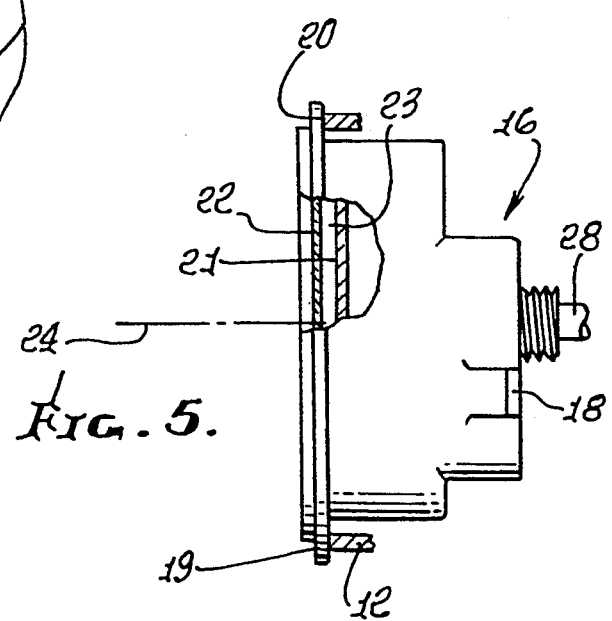

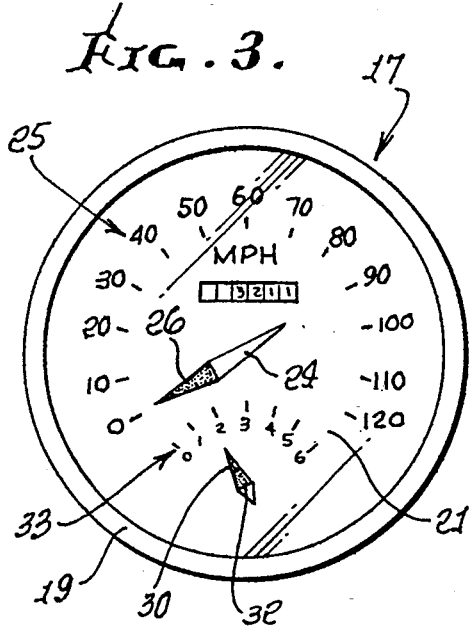
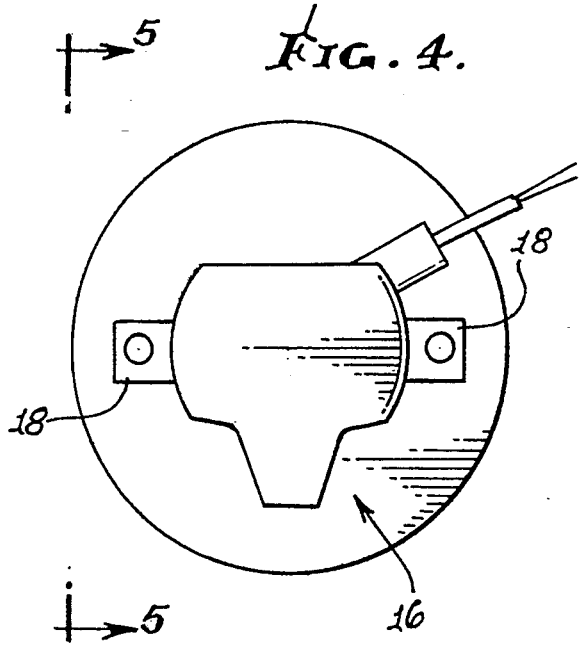
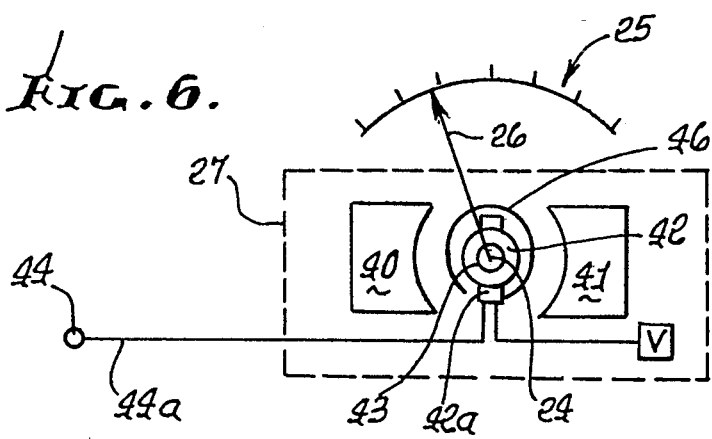
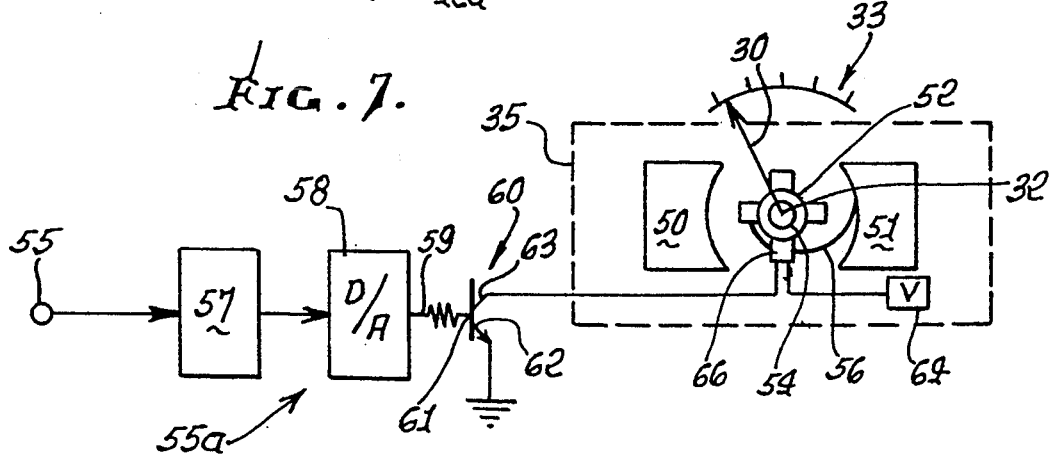

MOTORCYCLE SPEEDOMETER-TACHOMETER

This application is a continuation of Ser. No. 07/838,918 filed Feb. 21, 1992, now abandoned, which is a continuation of Ser. No. 07/727,352 filed Jul. 8, 1991, now abandoned, which is a continuation of Ser. No. 07/471,484 filed Jan. 29, 1990, now abandoned, which is a continuation of Ser. No. 07/371,196 filed Jun. 26, 1989, now abandoned, which is a continuation of Ser. No. 07/215,252 filed Jul. 5, 1988, now U.S. Pat. No. 4,848,154.

BACKGROUND OF THE INVENTION

This invention relates generally to use of speedometers and tachometers on motorcycles, and more particularly concerns the provision of an integrated instrument providing both MPH and RPM readings, at a single convenient location on a motorcycle, and away from handle bars.

In the past, separate speedometer and tachometer instruments were mounted, as on handle bars, of a motorcycle. Separate viewings of the two instruments at spaced locations was necessary, and the instruments interferred with handle bar use. No way was known to overcome these problems and difficulties, in the simple and highly effective manner as is now provided by the present invention.

SUMMARY OF THE INVENTION

It is a major object of the invention to provide apparatus overcoming the above problems and difficulties. Basically, the invention is embodied in a motorcycle speedometer assembly that also incorporates a separate tachometer, all in a casing mounted on a motorcycle fuel tank, to enable single glance readings of both instruments. The assembly includes:

a) a casing, and a display face on the casing, b) a first rotary indicator at said display face and rotatable about a first axis, there being first speed indicating indicia on said display first face with which the indicator registers as it rotates about said axis, c) a first drive responsive to motorcycle forward speed and connected with the first indicator for rotating said indicator in proportion to motorcycle speed to register with corresponding first indicia, d) and a second indicator at said display face and rotatable about a second axis to indicate motorcycle engine RPM, said second axis offset from said first axis, there being second indicia on said display face with which the second indicator registers as it rotates about said second axis, said second indicia indicating tachometer increasing values of RPM, e) and a second drive responsive to motorcycle engine RPM and connected with the second indicator for rotating said second indicator in proportion to engine speed to register with corresponding second indicia.

As will be seen, the first indicator has an associated relatively large sweep zone defining a first circle, and said second indicator has an associated relatively small sweep zone defining a second circle that intersects said first circle at one side of said first axis.

It is another object of the invention to provide simple drives for the indicators, the first drive including a first magnet, and a first rotary armature connected with the first indicator, the first armature including a coil, and a first source of electrical energization proportional to motorcycle speed, connected with the first coil; and the second drive including a second magnet, and a second rotary armature connected with the second indicator, the second armature including a coil, and a second source of electrical energization proportional to engine speed, connected with the second coil. The second source of energization may typically include a sensor to produce electrical pulses in proportion to engine RPM, a digital to analog converter responsive to said pulses to produce an analog signal output having an amplitude proportional to pulse rate, a transistor having base, emitter and collector terminals, the converter output connected to said base, the collector and emitter terminals defining a driver circuit connected to said second coil, and a voltage source connected to said circuit.

It is another object to provide the first indicia spaced along the large sweep zone in a first arc sub-tending about 270°, and the second indicia spaced along the smaller sweep zone in a second arc sub-tending about 90°, said first and second axes being parallel and defining a plane bisecting said two arcs. That second arc is preferably within the first circle, and the second ax s may intersect a path defined by the first circle, whereby the two sets of indicia are separate and offset, yet compact for quick, easy and accurate viewing.

Finally, the mounting includes a rearwardly elongated, wedge shaped carrier for said casing, the carrier having an upper surface substantially flush with said face, the carrier tapering rearwardly from said casing; and the carrier is carried by the engine fuel tank, as will be seen.

These and other objects and advantages of the invention, as well as the details of an illustrative embodiment, will be more fully understood from the following specification and drawings, in which:

DRAWING DESCRIPTION

FIG. 1 is a first perspective and generally forward view showing apparatus incorporating the invention, in a motorcycle;

FIG. 2 is a second and generally sideward view of the FIG. 1 apparatus;

FIG. 3 is a front view of the speedometer and tachometer unit of FIG. 1;

FIG. 4 is a rear view of the FIG. 3 unit;

FIG. 5 is a side view taken on lines 5—5 of FIG. 4;

FIG. 6 is an electrical schematic; and

FIG. 7 is also an electrical schematic.

DETAILED DESCRIPTION

In FIGS. 1 and 2, a motorcycle 10 has a bulbous fuel tank 11, oriented forwardly. Mounted on the top of the tank is a shell-like metallic carrier 12, which is rearwardly elongated and wedge-shaped. The carrier has opposite side walls 13, a top side 14 inclined downwardly and rearwardly, and a front wall 15, merging with walls 13 and 14. Wall 15 is forwardly convex, and elongated in an upright direction. Lower edges of walls 13 and 15, indicated at 13a and 15a are shaped to conform with the top surface 11a of the fuel tank, and the carrier is attached to the top of the fuel tank, in the position indicated by connector means not shown.

The hollow carrier receives or mounts casing 16 of a speedometer unit 17, better seen in FIG. 4 and 5. Attachment brackets 18 on the casing may be attached as by fasteners to structures associated with the carrier and within its hollow interior. Circular edge flange 19 of the casing fits upon the circular edge 20 of the carrier, the latter extending about an opening in the top wall 14. Accordingly, the remainder of the wall 14 between the flange 19 and the rear end of the wall 14 is free for instrumentation or other uses such as displays.

Referring now to FIGS. 3, and 5–7, the unit 17 includes a display face 21 spaced beneath a protective transparent (glass or plastic) cover panel 22, both peripherally carried by the casing so that the display face is fully visible through the cover panel 22. A first needle-type rotary indicator 26 extends in the space 23, between face 21 and cover 22, and it extends parallel to face 21 and is rotatable about a first central axis 24 normal to face 21. The indicator 26 is progressively registrable with first speed indicating indicia 25 arranged on the face 21 about axis 24 (as for example circularly about that axis). A first drive 27, seen in FIG. 6, is responsive to motorcycle forward speed and is connected, via shaft 28, with the first indicator, for rotating the latter in proportion to motorcycle speed, to proportionately register with the first indicia, numbered as shown to indicate speed in miles-per-hour.

A second needle-type rotary indicator 30 extends in space 23, between face 21 and cover 22, and it extends parallel to face 21 and is rotatable about a second axis 32 normal to face 21, to indicate motorcycle engine RPM (revolutions-per-minute), i.e. a tachometer. Second axis 32 is parallel to axis 24, but offset therefrom. Indicator 30 is progressively registrable, as it rotates, with second indicia 33 on the display face 21, and arranged in an arc about axis 32 (as for example circularly about that axis). A second drive 35, seen in FIG. 7, is responsive to motorcycle engine RPM, and is connected, via shaft 36, with the second indicator, for rotating the latter in proportion to engine RPM. The single digit numbers 1 to 6 of indicia 33 indicate RPM×1000.

It will be seen that the first indicia 25 has an associated relatively large sweep zone (about 270°) defining a first circle, and the second indicia 33 has an associated relatively small (about 90°) sweep zone defining a second circle that intersects or interrupts the first circle at the lower side of axis 24. The circular arc defined by the indicia 33 is about half-way between axes 24 and 31 and within the lowermost portion of the circle defined by indicia 25. Accordingly, the reading of both MPH and RPM is made very easy, i.e. at a glance, and separate from, yet close to one another.

In FIG. 6, the first drive 27 includes a first magnet having poles 40 and 41, and a first rotary armature 42 including a coil, rotatable on bearings 43, about axis 24, the armature including coil 42a. A first source 44 of electrical energization proportional to motorcycle speed as for example DC current, is connected at 44a with the first coil, so that coil and the indicator 26 are rotated in proportion to motorcycle speed, i.e. MPH. A coil spring 46 resists armature rotation.

In FIG. 7, the second drive 35 also includes a magnet having poles 50 and 51, and a second rotary armature 52 including a coil is connected with the second indicator 30 to rotate on bearings 54 about axis 32. A second source 55 of electrical energization proportional to engine speed, is connected at 55a with the second coil, so that indicator 30 and the second armature are rotated in proportion to engine speed (RPM). A coil spring 56 yieldably resists armature rotation. More specifically, the second source of energization is shown to include a sensor 57 to produce electrical pulses in porportion to engine RPM, a digital to analog convertor 58 responsive to the pulses to produce an analog signal output at 59 having an amplitude proportional to pulse rate, and a transistor 60 having base, emitter and collector terminals at 61–63. The convertor output at 59 is connected to base terminal 61, and the collector and emitter terminals 62 and 63 define a drive DC circuit connected to the second coil 66, a source of voltage 64 also connected with the drive circuit. As output 59 increases, base 61 is biased to increase the DC flow in the drive circuit, so that the second armature and indicator 30 deflect a corresponding amount.

As a result, a highly compact unit providing easily readable and segregatable values of RPM and MPH is provided; and there is no need for mounting separate speedometer and tachometer casings and face plates on the motorcycle, as for example on the handle bar or bars. Also, the RPM and MPH readouts are so positioned as not to interfere, yet they have their own separate sweeps, arranged for "at-a-glance" viewing, directly below and forwardly of the rider's head, over the fuel tank.

I claim:

1. A motorcycle speedometer assembly,
   a) a casing, and a display face on the casing,
   b) a first rotary indicator at said display face and rotatable about a first axis, there being first speed indicating indicia on said display face with which the indicator registers as it rotates about said axis,
   c) a first drive responsive to motorcycle forward speed and connected with the first indicator for rotating said indicator in proportion to motorcycle speed to register with corresponding first indicia,
   d) and a second indicator at said display face and rotatable about a second axis to indicate motorcycle engine RPM, said second axis offset from said first axis, there being second indicia on said display face with which the second indicator registers as it rotates about said second axis, said second indicia indicating tachometer increasing values of RPM,
   e) and a second drive responsive to motorcycle engine RPM and connected with the second indicator for rotating said second indicator in proportion to engine speed to register with corresponding second indicia,
   f) said first and second indicators each being linearly elongated, and said first indicator having an associated relatively large sweep zone defining a first circular zone which also encompasses said first indicia and said second indicator having an associated relatively small sweep zone defining a second circular zone that intersects said first circular zone at one side of said first axis,
   g) said first indicia spaced along said first circular zone in a first arc sub-tending about 270°,
   h) said second indicia spaced along said second circular zone in a second arc sub-tending at least about 90°, said first and second axes being parallel and defining a plane bisecting said two arcs,
   i) said second arc located substantially within said first zone, and said second axis intersecting a path defined by said first zone,
   j) means on the casing for mounting the casing to a forwardly extending carrier on the motorcycle with said plane then extending forwardly, and with said first axis located forwardly of said second axis,
   k) said first and second axes being normal to said display face.

2. The assembly of claim 1 wherein said second drive includes a magnet, and a rotary armature connected with the indicator, the second armature including a coil, to be electrically energized in proportion to engine speed.

3. The invention of claim 1 including said carrier which is rearwardly elongated, and wedge shaped, the carrier having an upper surface substantially flush with said face, the carrier tapering rearwardly from, and mounting, said casing.

4. The assembly of claim 1 wherein the casing is circular and surrounds said first and second zones.

5. The assembly of claim 2 wherein the carrier has a front surface which extends downwardly immediately forwardly of said casing and toward a fuel tank which supports the carrier.

6. The assembly of claim 5 wherein the casing is everywhere spaced above the fuel tank.

7. The combination of claim 1 including a cover panel on the casing and through which said face and both said indicators are fully visible.

8. The combination of claim 7 including said carrier having an upper surface which extends substantially flush with said cover panel, said face located proximate and beneath said cover panel.

* * * * *